INVENTOR:
JAMES E. WALDRON,
BY Albert S. Richardson Jr.
ATTORNEY

Oct. 6, 1970 J. E. WALDRON 3,532,935

STATIC NETWORK PROTECTIVE RELAY

Filed Feb. 21, 1968 9 Sheets-Sheet 2

INVENTOR:
JAMES E. WALDRON,
BY Albert S. Richardson Jr.
ATTORNEY

INVENTOR:
JAMES E. WALDRON,
BY Albert S. Richardson Jr.
ATTORNEY

STATIC NETWORK PROTECTIVE RELAY

Filed Feb. 21, 1968 9 Sheets-Sheet 4

INVENTOR:
JAMES E. WALDRON,
BY Albert S. Richardson Jr.
ATTORNEY

INVENTOR:
JAMES E. WALDRON,
BY Albert S. Richardson Jr.
ATTORNEY

INVENTOR:
JAMES E. WALDRON,
BY Albert S. Richardson Jr.
ATTORNEY

Oct. 6, 1970 J. E. WALDRON 3,532,935

STATIC NETWORK PROTECTIVE RELAY

Filed Feb. 21, 1968 9 Sheets-Sheet 7

INVENTOR:
JAMES E. WALDRON,
BY Albert S. Richardson, Jr.
ATTORNEY

Oct. 6, 1970 J. E. WALDRON 3,532,935

STATIC NETWORK PROTECTIVE RELAY

Filed Feb. 21, 1968 9 Sheets-Sheet 8

INVENTOR:
JAMES E. WALDRON,
BY Albert S. Richardson Jr.
ATTORNEY

INVENTOR:
JAMES E. WALDRON,
BY Albert S. Richardson Jr.
ATTORNEY

United States Patent Office
3,532,935
Patented Oct. 6, 1970

3,532,935
STATIC NETWORK PROTECTIVE RELAY

James E. Waldron, Drexel Hill, Pa., assignor to General Electric Company, a corporation of New York Filed Feb. 21, 1968, Ser. No. 707,092
Int. Cl. H02h 3/18, 1/04
U.S. Cl. 317—23 20 Claims

ABSTRACT OF THE DISCLOSURE

A static protective relay comprises a power directional unit and a reclosing unit controlling a circuit breaker which couples a primary feeder or a source of supply of a three-phase power distribution system to an alternating current secondary network through a network transformer. The power directional unit senses reverse power flow from the network to the network transformer to energize a tripping coil at the circuit breaker. Included in the power directional unit is a voltage deriving circuit producing a voltage proportional to the system current through the circuit breaker, a modulator which modulates that voltage by a voltage proportional to the system voltage at the circuit breaker to obtain an output proportional to real power flow through the circuit breaker, and a detector which energizes the tripping coil upon presence of a reverse power flow signal from the modulator. Once the circuit breaker has been opened, the reclosing unit allows the circuit breaker to reclose only if system conditions are such that power will flow from the transformer to the network. Included in the reclosing unit is a NOR circuit having as inputs an output from a circuit producing a D-C voltage whenever the voltage difference across one phase of the circuit breaker is less than a certain magnitude, a voltage proportional to the sum of the voltages across another phase of the circuit breaker, and two voltages proportional to the voltage at one phase of the network, as phase-shifted by two circuits. The NOR circuit produces an output only when no signal is present at any of the inputs. This output is coupled to a timing circuit within the reclosing unit; if output persists for 85° of the network voltage cycle, the timing circuit energizes a reclosing coil of the circuit breaker.

BACKGROUND OF THE INVENTION

This invention relates generally to power distribution systems including alternating current secondary networks and more particularly to a protective relay controlling a circuit breaker or network protector which connects a primary feeder to such a secondary network.

An alternating current secondary network comprises a grid of interconnected cables which are energized at a voltage suitable for distribution to a plurality of residential, industrial and commercial loads. To insure continuity of service in a heavy load-density municipal area, the grid is supplied from primary or high voltage feeders at many points. When a source of supply or primary feeder is lost, the load formerly supplied by that feeder is absorbed by the other, remaining feeders. Each primary feeder is connected to the network through at least one network transformer, network protector, and a set of fuses.

A protective relay associated with the network protector and the fuses is designed to maintain the network in electrical connection with the primary feeder only for certain well-defined conditions of operation. For instance, it is accepted practice that the network protector be opened by its protective relay when any fault exists on the primary feeder which would cause power flow from the network to the feeder, hereinafter designated as reverse power flow, but not for faults on the network itself. In turn, the fuses are designed with a long time delay to accommodate these secondary network faults. In addition, it is desirable practice that the protective relay open the network protector when the primary feeder is disconnected from its source of supply and magnetizing current flows from the secondary network into the network transformer. In sum, it is accepted practice to operate these alternating secondary networks in such a manner so that any network transformer which is not delivering power to the network is disconnected therefrom. It is also necessary that the protective relay not allow the network protector to close when conditions are such that power would flow from the network to the primary feeder.

These results have generally been satisfactorily obtained by prior art electromechanical relays. One example of such a relay is found in U.S. Pat. No. 1,971,810, Blake, assigned to the assignee of the present invention. In practice, relays like that in the Blake patent have been found to be susceptible to several, serious drawbacks. For instance, they are sensitive to environmental conditions, their performance being adversely affected by changes in temperature in particular unless expensive compensating means are provided. Further, due to the mechanical nature of these relays, constant maintenance is required to furnish reliable operation in such an application as an alternating current secondary network. The relays, by placing a heavy burden or power drain on relaying transformers necessary to connect them to the network, affect the accuracy of any relaying signals obtained from the transformers. Moreover, when these relays are fitted with the necessary compensating means and are designed so as to facilitate constant and frequent maintenance, they are bulky in size and expensive.

SUMMARY OF THE INVENTION

It is therefore a specific object of this invention to replace the prior art electromechanical relays associated with network protectors with a static or solid-state equivalent which results in greater reliability, accuracy and lower maintenance cost.

It is yet another object of this invention to provide a protective relay for a secondary network which is relatively insensitive to environmental conditions without the need of an expensive compensating means.

Briefly, this invention contemplates a protective relay comprising a power directional unit which senses power flow from the network to the feeder to thereby energize a tripping coil of the network protector and a reclosing unit which energizes a closing coil of the network protector only when certain conditions on both the network side and transformer side of the network protector are met, whereby power may flow from the transformer to the network.

BRIEF DESCRIPTION OF THE DRAWINGS

The subject matter of the invention is particularly pointed out and distinctly claimed in the concluding portion of the specification. For a complete understanding of the invention together with further objects and advantages thereof, reference should be made to the following description taken in connection with the accompanying drawings in which:

DESCRIPTION OF THE PREFERRED EMBODIMENT

Figure 1:
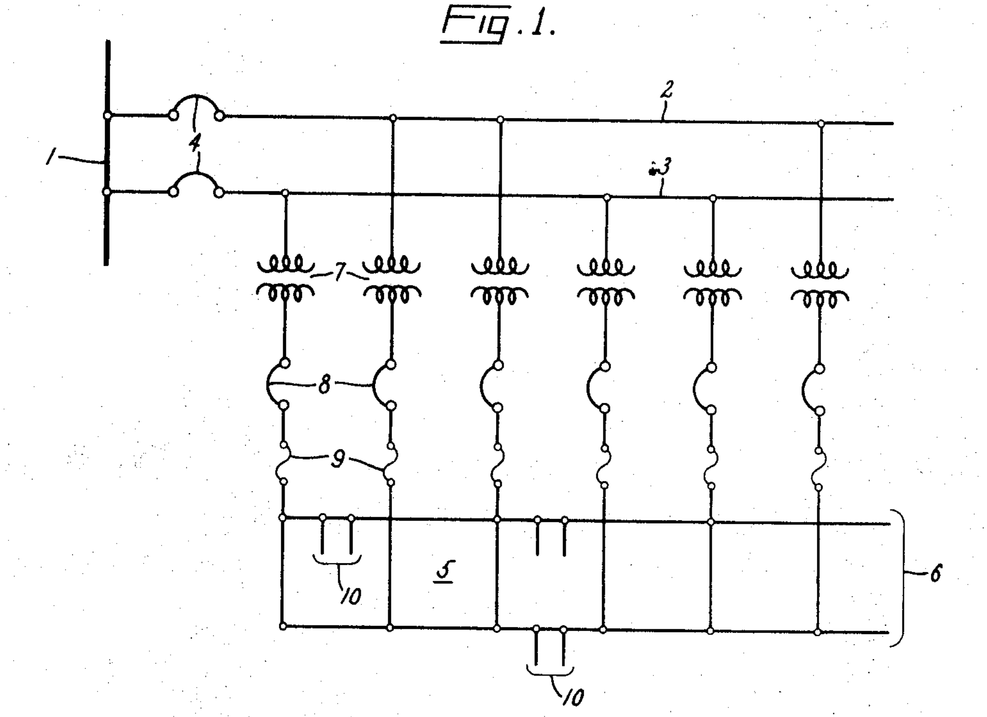
FIG. 1 is a single line schematic diagram of a typical alternating current secondary network system.

Now turning to the drawings, FIG. 1 shows an alternating current secondary network system. While this invention will be described in terms of a three-phase distribution system, it is to be clearly understood that the teachings thereof are applicable to any multi-phase system in which reverse power flows might occur. Included is a primary voltage bus 1 of a distribution substation and two primary feeders 2, 3 which are connected to the bus 1 through two station circuit breakers 4. The alternating current secondary network is generally represented by numeral 5 and comprises a plurality of interconnected cables 6 which are connected to primary feeders 2 and 3 at a plurality of points. Each connection to the primary feeders is made by a network transformer 7 through a network protector 8, and a set of fuses 9. Connected to secondary network cables 6 are a plurality of load feeder circuits 10.

A network protective relay is associated with each network protector 8 to control that protector in accordance with established power company practice. As previously mentioned, the desired functions of such a relay are as follows: (a) The relay should open the network protector 8 upon the occurrence of any reverse power flow to its primary feeder to disconnect only that feeder from the alternating current secondary network 5. (b) The relay should not open the network protector 8 upon occurrence of a fault on the secondary network 5 to insure continuity of service. These secondary faults are cleared either by burning themselves clear, by the set of fuses 9 used in conjunction with each network protector 8, or by other disconnecting devices in the load feeder circuits 10. (c) The relay should be sensitive enough to open the network protector 8 on the magnetizing current of network 7 when one of the station circuit breakers 4 is opened. (d) The relay should reclose the network protector 8 only when power will flow from the network transformer 7 to the alternating current secondary network 5.

Figure 2A:
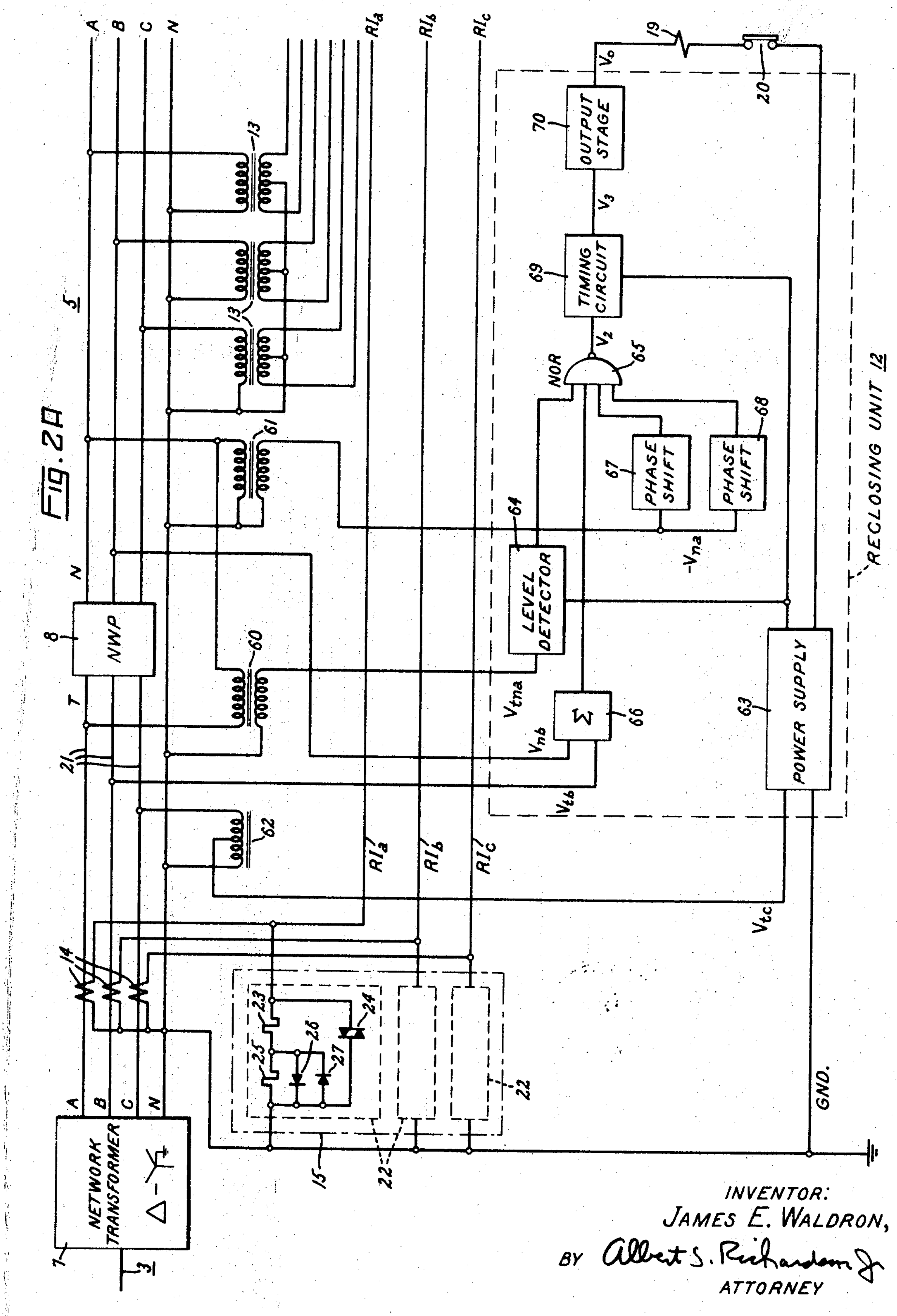
FIG. 2A on sheet 2 and the continuing FIG. 2B on sheet 3 form a block diagram of the protective relay of this invention, together with its associated network protector and relaying transformers.
Figure 2B:
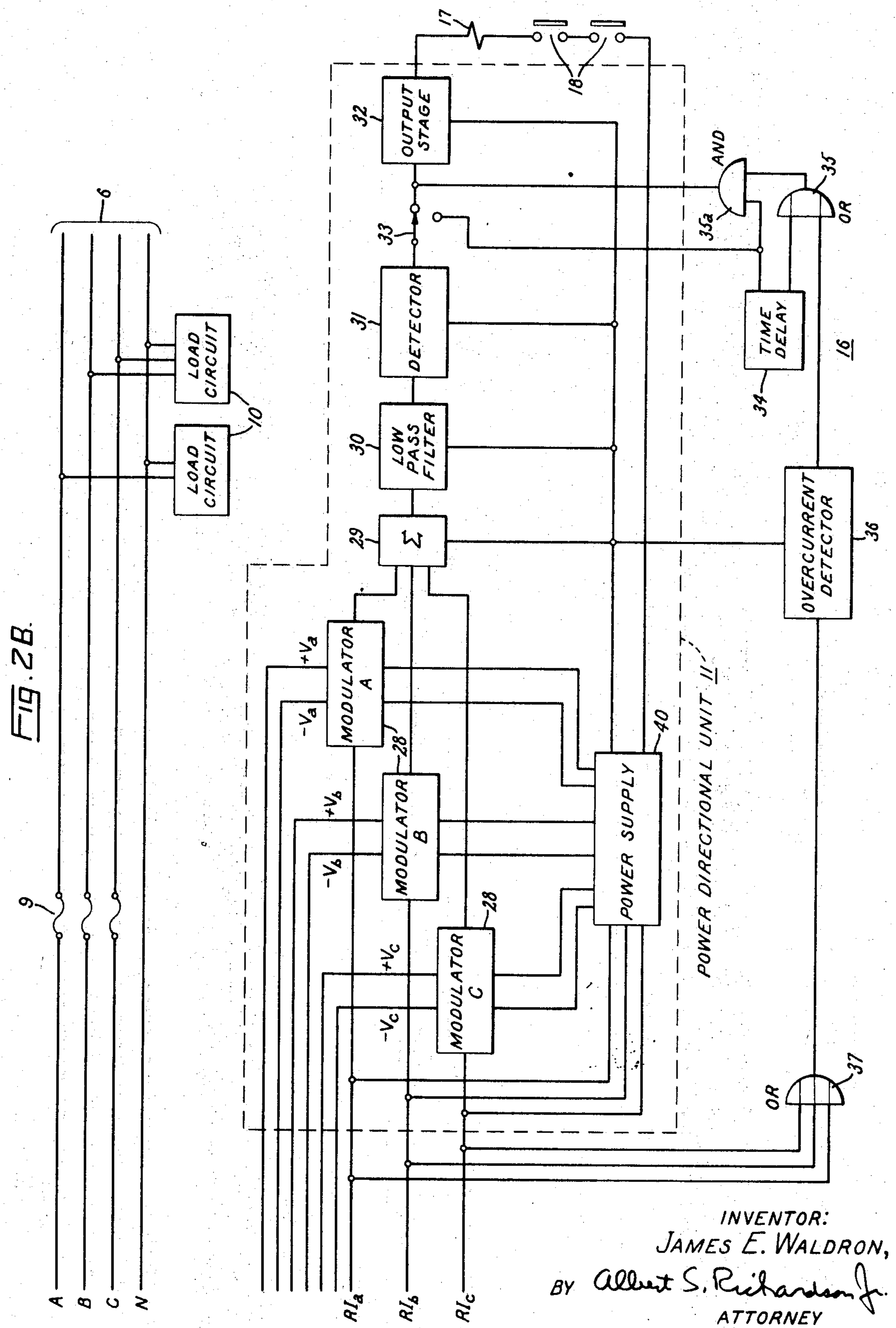

To achieve these functions, this invention contemplates a static protective relay, such as shown in the companion FIGS. 2A and 2B, which comprises a power directional unit 11 and a reclosing unit 12. The power directional unit 11 is directly connected to a plurality of potential transformers 13 disposed on the network side of the network protector 8, and to a corresponding plurality of current transformers 14 disposed on the transformer side of the network protector through a voltage deriving circuit 15. A desensitizing function unit 16 may be connected into unit 11 to provide various delays in opening network protector 8 upon reverse power flow. Connected to the output of power directional unit 11 is a trip coil 17 and several *a* contacts 18 of the network protector. An *a* contact is an auxiliary contact which is closed when the network protector main contacts are closed and which opens when the main contacts open. The reclosing unit 12 receives inputs from the potential transformers disposed on both sides of the network protector. Connected to the output of the reclosing unit is a closing coil 19 and a *b* contact 20 of the network protector. A *b* contact is an auxiliary contact which is open when the network protector main contacts are closed and which closes when the main contacts open.

The power directional unit 11 is responsive to power flow, hereinafter designated as reverse power flow, through the network protector 8 from the network 5 to the transformer 7. Therefore, the currents and voltages existing in the system comprising network cables 6 and conductors 21 between the transformer 7 and network protector 8 must be measured to provide quantities to the power directional unit 11 which are representative of reverse power flow. To this end, a current indication is obtained from the secondary winding of each of the plurality of current transformers 14 whose primary windings are disposed in circuit relation with conductors 21 of phases A, B, and C. Although the secondary of transformer 7 is shown in FIG. 2A as being connected in grounded Y, it is to be clearly understood that any other configuration commonly used in practice would be acceptable. Similarly, the connection of the current transformers 14 depends on the configuration of the secondary of transformer 7.

The secondaries of current transformers 14 are connected to the voltage deriving circuit 15, which includes three similar elements 22, one for each secondary. Each element 22 includes a resistor 23 having a first side attached to a common point between the current transformer secondary and a varistor 24 which is connected to ground. The other side of resistor 23 is likewise connected to ground through a parallel circuit including a resistor 25 and two reverse-parallel connected diodes 26 and 27.

Each current transformer 14 produces a small current signal in its secondary which is proportional to primary current. Simply, the voltage deriving circuit changes the current signal from each current transformer secondary into a voltage signal, hereinafter designated as RI. This voltage RI is proportional to the secondary current signal except at very low and very high current values, as will be shown. More particularly, the function of the varistor 24 is to limit surges on the system to a value safe for the power directional unit 11. The remainder of each element 22 including resistors 23 and 25 and diodes 26 and 27 additionally operates to shift the phase and increase the magnitude of the RI signal upon low magnitude thereof so as to increase the sensitivity of power directional unit 11. The magnitude of resistance 25 with respect to 23 is large. At low secondary currents, the voltage across diodes 26 and 27 is such that they do not conduct and the current transformer secondary is loaded by both resistors 23 and 25, a high resistance of approximately 500 ohms, for example. At relatively high secondary currents, the voltage across diodes 26 and 27 increases and both diodes conduct. As the large resistor 25 is shorted thereby, the current transformed secondary is loaded with a low resistance of about 50 ohms.

The significance of this operation is that at low currents, the voltage RI is proportionately larger than at high currents. Also, as the load on the current transformer secondary is changed at low currents, the phase angle of the current signal therefrom is shifted. The advantages resulting from proportionately increasing the magnitude of RI and shifting its phase will be seen hereinafter when the operation of the power directional unit is more closely examined.

The signals RI from the elements 22, now designated at $RI_a$, $RI_b$, and $RI_c$, are fed to corresponding modulators 28 in the power directional relay 11.

Each modulator 28 produces a bipolarity output voltage whose average value is proportional in sense and magnitude to real power in the associated phase. To accomplish this result, each modulator 28 is fed with the afore-mentioned RI voltage and two voltages which are derived from a center-tapped secondary of an associated potential transformer 13 whose primary is connected between a phase conductor of the same phase and the neutral conductor of the network 5. More particularly, the secondary of each potential transformer 13 has its center tap grounded so that a balanced pair of voltages, which are hereinafter designated as + and −V, are presented to each modulator. In essence, each modulator 28 acts as a switch, allowing the input voltage R1 to be present at its output when the corresponding modulating voltage +V is positive. It will be analytically shown that the output signal represents, for a particular phase, the quantity $KI \cos \theta$, where K is a constant, I is the phase current, and $\theta$ is the angle between the current I and voltage V.

Since the real single-phase power flow through the network protector 8 is proportional to $V_{\phi-N} I \cos \theta$, where $V_{\phi-N}$ is the phase-to-neutral voltage, it can be seen that if $V_{\phi-N}$ is fairly constant, the quantity $KI \cos \theta$ is so nearly equal to the real power flow that the error is insignificant.

The output signal of each modulator is fed to a summation circuit 29 whereby an output signal representing the algebraic sum of the modulator output signals and thus the three-phase power flow is obtained. The summation circuit 29 output is fed through a low pass filter 30 to a detector 31. Each potential transformer 13, current transformer 14, and the associated circuitry of the power directional unit 11 has been polarized so that the resultant signal at the output of the filter 30 will have positive polarity only when reverse power flow is present in the corresponding phase. Accordingly, the detector 31 senses a small positive voltage to provide a signal to an output stage 32 of the power directional unit 11. The low pass filter 30 acts to eliminate any AC components of the three-phase output signal fed from the summation circuit 29 which might incorrectly actuate the detector 31. For example, were the average value of the output signal from summation circuit 29 is negative, a positive-going portion of one modulator's output could actuate detector 31.

The output stage 32 when activated by the detector 31 will initiate a predetermined control function, such as energizing the tripping coil 17 of the network protector 8. As shown in FIG. 2B, a switch 33 connects the detector 31 to output stage 32 either directly or through the desensitizing function unit 16. If directly, the output stafe 32 energizes the tripping coil 17 immediately upon reverse power flow. If through unit 16, output stage 32 energizes tripping coil 17 after a predetermined time delay, or without time delay if reverse power flow occurs due to a fault on the primary feeder. Unit 16 includes a time delay circuit 34, an OR gate 35, and an AND gate 35*a*. Also connected to OR gate 35 is the output of an overcurrent detector 36 which receives the signals $RI_a$, $RI_b$, and $RI_c$ through an OR gate 37. The output of OR gate 35 provides an auxiliary input for the AND gate 35*a* whose other input is taken directly from the polarity detector 31. In operation, if the switch 33 connects detector 31 to desensitizing function unit 16, output stage 32 energizes tripping coil 17 only after a predetermined time, as set by circuit 34, unless reverse fault current in the phases as represented by the RI signals is of sufficient magnitude to energize overcurrent detector 36 which causes immediate tripping. Contacts 18, which are closed when network protector 8 is closed, are opened by the tripping of network protector 8 to de-energize tripping coil 17.

Delayed sensitive function unit 16 per se forms no part of this invention, and detector 31 may solely control output stage 32 as shown.

Finally, in this embodiment, a control power source 40 is supplied by the relaying transformers 13 and 14, as its inputs include the RI and + and −V signals of each phase. Alternatively, power directional unit 11 could be operated from a separate, external source of control power.

Figure 3:
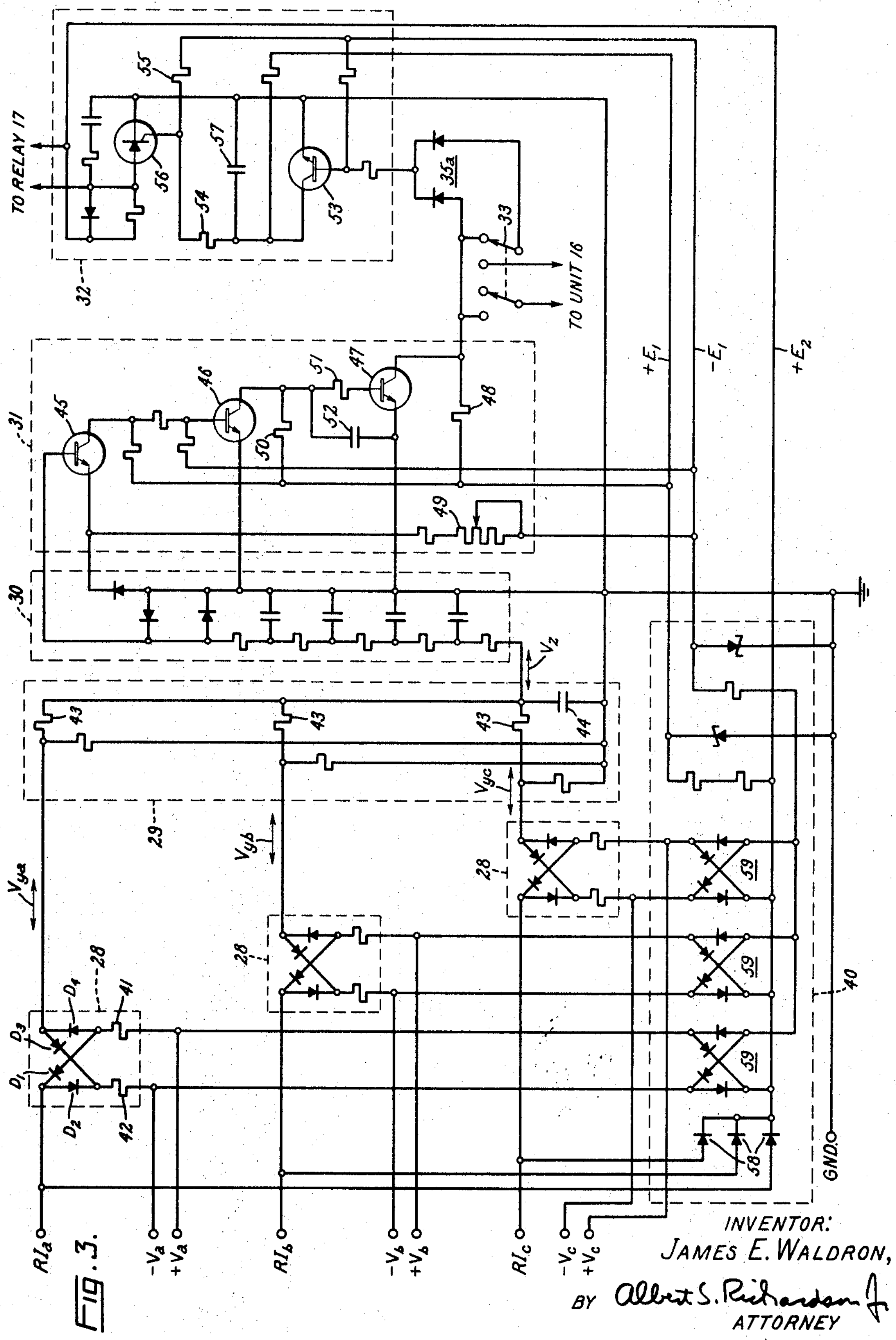
FIG. 3 is a schematic diagram of a preferred embodiment of the power directional unit of this invention.

A preferred embodiment of the power directional relay 11 is shown in FIG. 3. The blocks of FIG. 2 are illustrated by corresponding numerals in FIG. 3. Each modulator 28 is seen to comprise four diodes, $D_1$, $D_2$, $D_3$, $D_4$, connected in a bridge circuit. The signal RI is supplied to the leg of the bridge including $D_1$ and $D_2$ and an output, hereinafter designated as $V_y$, is taken from the leg of $D_3$ and $D_4$. Voltages + and −V are connected to the legs including $D_1$ and $D_4$ and $D_2$ and $D_3$ through resistors 41 and 42, respectively.

Now considering the phase A modulator, the others being similar, when $+V_a$ is positive, all the diodes are forward biased. As a result, an input signal $RI_a$ can flow through either one of two paths: through $D_1$ and $D_4$, or through $D_2$ and $D_3$. In effect, the modulator 28 is shorted and the input signal $RI_a$ appears at the output as $V_{ya}$. When $+V_a$ becomes negative, all the diodes are reverse biased and no input signal $RI_a$ can be present at the output, $V_{ya}$ equaling zero.

So long as the RMS magnitude of network voltage is relatively constant, the output $V_{ya}$ is proportional to average power flow in phase A. This can be demonstrated by integrating an expression for the voltage $RI_a$ over a period when $+V_a$ is positive. If $+V_a$ is assumed to be positive from $wt=0$ to $wt=\pi$, then $$V_{ya}=\frac{2RI_a}{\sin (wt+\theta)dwt}=\frac{2}{RI_a \cos \theta}$$

In practice, $V_{ya}=KI \cos \theta$, where K=constant, for all diodes $D_1$–$D_4$ remain in a forward biased condition only when the magnitude of signal current therein resulting from the voltage $RI_a$ is less than a biasing current resulting from the voltages + and $-V_a$. When the signal current exceeds the biasing current, either diodes $D_1$ and $D_3$ or diodes $D_2$ and $D_4$ become reverse biased, thus limiting the output product by input Signal $RI_a$. Effectively, $V_{ya}$ is clamped above a certain level of $RI_a$. At low signal currents, $V_{ya}$ is less than $RI_a$, as a voltage divider is formed by the internal impedance associated with the $RI_a$ circuit, the impedance of the power direction unit 11 as seen by $V_{ya}$ and resistance 41 and 42. Thus $V_{ya}$ at low signal currents is a certain percentage of the input $RI_a$. Although the value of the constant K varies somewhat due to this clamping, the phase relationship of $RI_a$ and $V_{ya}$ is not disturbed. Moreover, as the detector 31 can be actuated upon a very small positive voltage in the order of 50 mv., a slight variation in the large voltage $V_{ya}$ can be disregarded.

The output $V_y$ of each modulator 28 is connected through a resistor 43 to one side of a capacitor 44. The other side of capacitor 44 is connected to ground. The resistors 43 and capacitor 44 form the summation circuit 29. An output taken from capacitor 44 is hereinafter designated as $V_z$, and represents the average, three-phase power flow through network protector 8.

Figure 4:
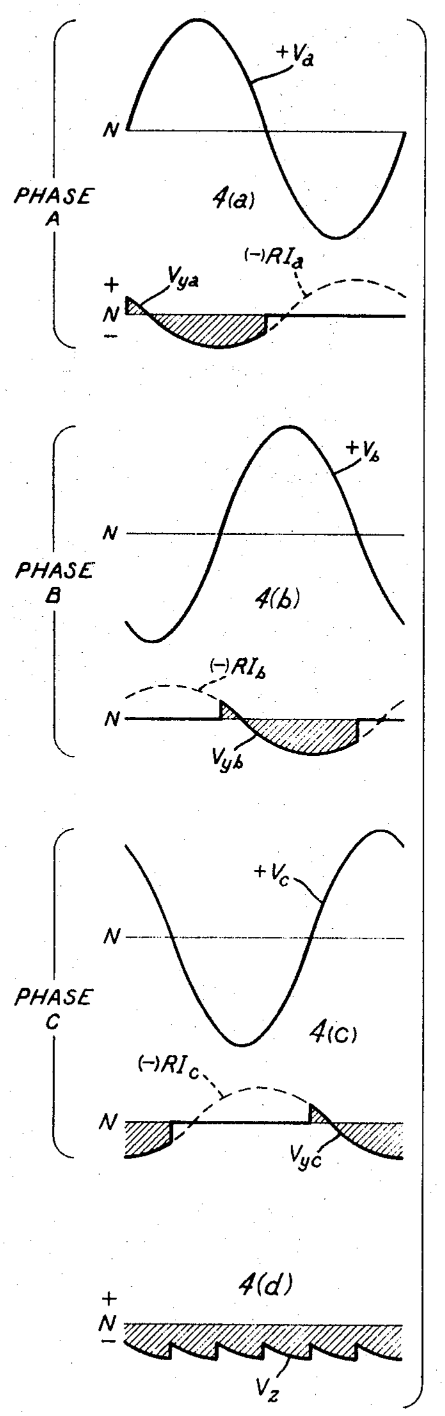
FIGS. 4, 5, and 6 are voltage waveforms of the power directional unit for three possible system conditions.
Figure 5:
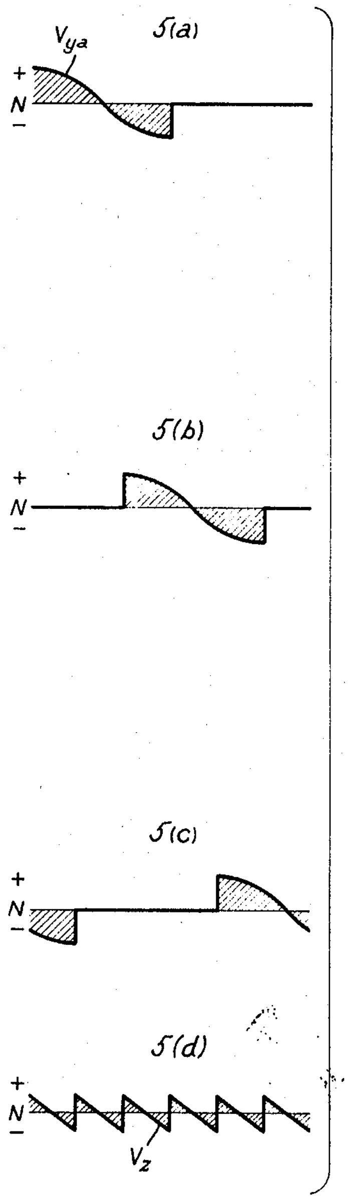
Figure 6:
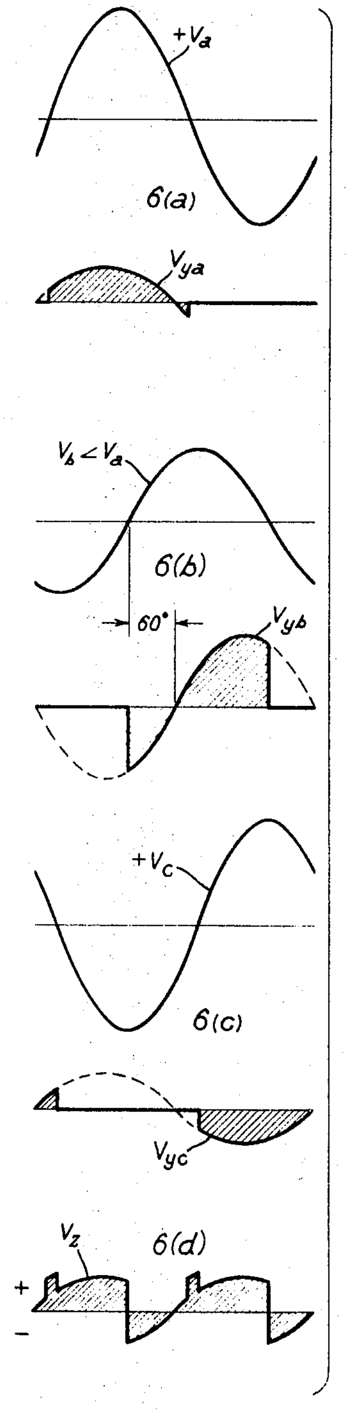

Referring now to FIGS. 4–6, voltage waveforms of +V, RI, $V_y$, $V_z$ are illustrated for three possible conditions. FIG. 4 represents the situation where normal load current flows through network portector 8 into network 5 and the currents in phases A, B, and C are balanced. Further, each phase voltage, represented as +V, leads each phase current, represented as RI, by approximately 30°. Accordingly, $\theta=-30°$. It should be noted that due to connection of the current transformers 14, RI is 180° displaced in phase from the phase current. In FIG. 4(*a*), $+V_a$ is seen to vary sinusoidally about the neutral level N. The graph immediately below the $+V_a$ plot is that of $V_{ya}$, or the modulator 28 output, and $RI_a$. As discussed previously, $V_{ya}$ varies from the neutral level N only for those portions of the $RI_a$ curve where $+V_a$ is positive. As seen in FIG. 4(*a*), the average value of $V_{ya}$ is negative, the greater portion thereof lying below the neutral voltage. Similar comments can be made with respect to phases B and C, illustrated in FIG. 4(*b*) and FIG. 4(*c*). In FIG. 4(*d*), $V_z$, or the output of the summation circuit 29, is seen to have a negative average value, which corresponds to power flow from the transformer 7 to the network 5. In this case, the detector 31 cannot actuate output stage 32 to energize tripping coil 17.

A similar result is obtained in FIG. 5 wherein each phase current lags its phase voltage by 90° in a balanced system. Only the modulator outputs $V_y$ are shown in FIG. 5(*a*), 5(*b*), and 5(*c*); the output of the summation circuit 29, $V_z$, is seen in FIG. 5(*d*), and it can be seen that the average value of $V_z$ and $V_{ya}$, $V_{yb}$, and $V_{yc}$ is zero which corresponds to reactive power flow through network protector 8. FIG. 5(*d*) also illustrates a condition where the low pass filter 30 can prevent false actuation of the polarity detector 31 on the positive peaks of $V_z$.

Assume that there is a phase A to phase C fault condition on the primary network transformer 7. The voltages then appear as illustrated in FIG. 6. Note that voltages $+V_a$ and $+V_c$ are 180° out of phase, and that the fault impedance angle is assumed to be 60° wherein the current in phase B leads $+V_b$ by 120°. It can be seen from FIG. 6(*a*) and 6(*c*) that $V_{ya}$ has a positive average value whereas $V_{yc}$ has a negative average value which effectively cancels $V_{ya}$ over an entire voltage cycle. Therefore, the average value of $V_{yb}$ is controlling. As seen in FIG. 6(*b*), $V_{yb}$ has a positive average value. Similarly, $V_z$ in FIG. 6(*d*) has a positive average value whereby detector 31 is actuated.

The low pass filter 30 may comprise the circuitry illustrated in FIG. 3; however, it is to be understood that any of a number of well-known designs could be used. The attenuation of the filter at power frequency, 60 Hz., must be sufficient to insure that only the average value of the summation circuit output Vz be presented to detector 31.

Similarly, the detector 31 can be any one of a number of well-known constructions which are adapted to sense a small voltage appearing at the output of the low pass filter 30. In FIG. 3, the detector 31 is shown to comprise three transistors 45, 46, 47 which are normally biased so that transistors 45 and 47 are off and transistor 46 is on. In this state, the collector of transistor 47 is maintained at a positive voltage by resistor 48 connected to a positive voltage supply $+E_1$. When a positive signal exceeding a threshhold magnitude determined by the setting of a potentiometer 49 appears at the output of the low pass filter 30, transistor 45 turns on, and transistor 46 turns off. Current then flows from the positive voltage supply +E, through a resistor 50 to a junction of a resistor 51 connected to the base of transistor 47 and a capacitor 52 connected to the grounded emitter of transistor 47. Capacitor 52 provides a time delay in the turning on of transistor 47 by current through resistor 51, acting as a shunt for that current until charged. Thus, momentary power reversals will not energize detector 31. When transistor 47 is energized, its collector voltage drops to approximately zero volts.

The output of detector 31 is taken from the collector of transistor 47 and is fed through switch 33 to the output stage 32 which is designed to be used with a particular network protector tripping coil or with associated other circuitry. In FIG. 3, output stage 32 comprises a transistor 53 which is normally maintained in a completely on condition by the positive output voltage of detector 31. In this case, resistors 54 and 55 provide a voltage divider between voltages $+E_1$ and $-E_1$. The resistor values are chosen so that the voltage at the gate of an SCR 56 is lower than the voltage at the cathode of SCR 56, thereby reverse-biasing the gate electrode of SCR 53 and maintaining SCR 53 in a non-conducting state. While the output voltage of detector 31 goes to zero, transistor 53 is turned off, allowing capacitor 57 to charge and then to discharge through the gate electrode of SCR 56 to turn SCR 56 on. Thereby, voltage supply $+E_2$ is connected in series with tripping coil 17 and contacts 18. As previously mentioned, if switch 33 is connected to unit 16, output stage 32 will be energized through an auxiliary input.

Figure 7:
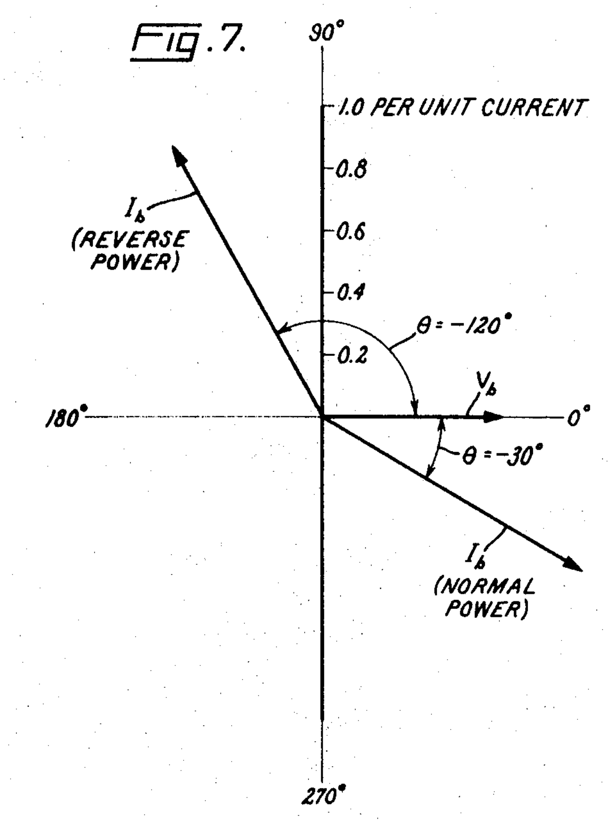
FIGS. 7 and 8 are generalized response curves for the power directional unit of this invention.
Figure 8:
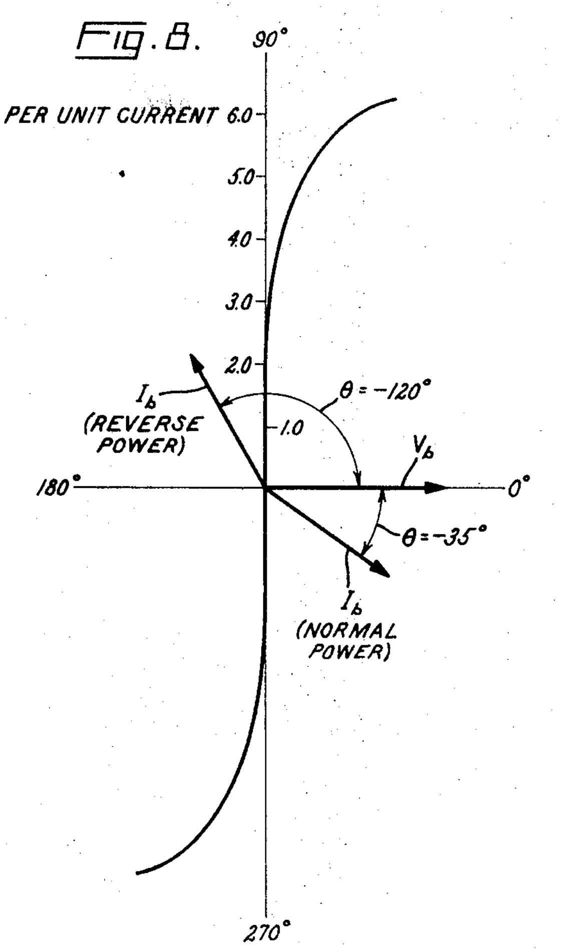

A generalized response curve for a single-phase section of the power directional unit 11 is illustrated in FIGS. 7 and 8. FIG. 7 shows the curve for phase currents up to 100% of a rated load current of 1600 amps. FIG. 8 shows the generalized curve extended to 600% rated load current. In both FIGS. 7 and 8, the network phase to neutral voltage, that previously designated as $V_a$, $V_b$, or $V_c$, is conveniently shown as a vector extending from the center of the plot along the 0° axis, or to the right thereof. Therefore, a vector designating the network phase current must lie to the right of the area bounded by the 90° and 270° axes for power to flow from the primary feeder 3 through the network transformer 7 and protector 8 to the network 5. Likewise, any vector that terminates in the left-hand portion designates a reverse power flow. The curves depicted in FIGS. 7 and 8 show how the power directional unit 11 distinguishes normal and reverse power flows. The power directional unit 11 produces a tripping signal through the output stage 32 when the phase current terminates to the left of the generalized response curve.

In FIG. 7, the response curve closely approximates the 90°–270° axes.

For larger phase currents, as shown in FIG. 8, the curve shows the effect of saturation in the current transformer 14 associated therewith, the curve departing significantly from the 90°–270° at about 300% of rated current.

The conditions used in FIGS. 4 and 5 to depict operation of the modulators 28 are shown in FIG. 7 for phase B. The phase current vector $I_b$ at both 30° and 90° lag terminates within the right-hand portion of the generalized response curve, resulting in no operation of the tripping coil 17.

Likewise, the condition in FIG. 6 is illustrated in FIG. 8 for phase B. The phase current vector $I_b$ at 120° lead terminates within the left-hand portion of the generalized response curve, resulting in operation of the tripping coil 17. Also shown in FIG. 8 is a condition wherein a fault occurs on the network and the phase current vector $I_b$ is at 35° lag. As the vector terminates in the right-hand portion, no tripping coil operation results.

Figure 9:
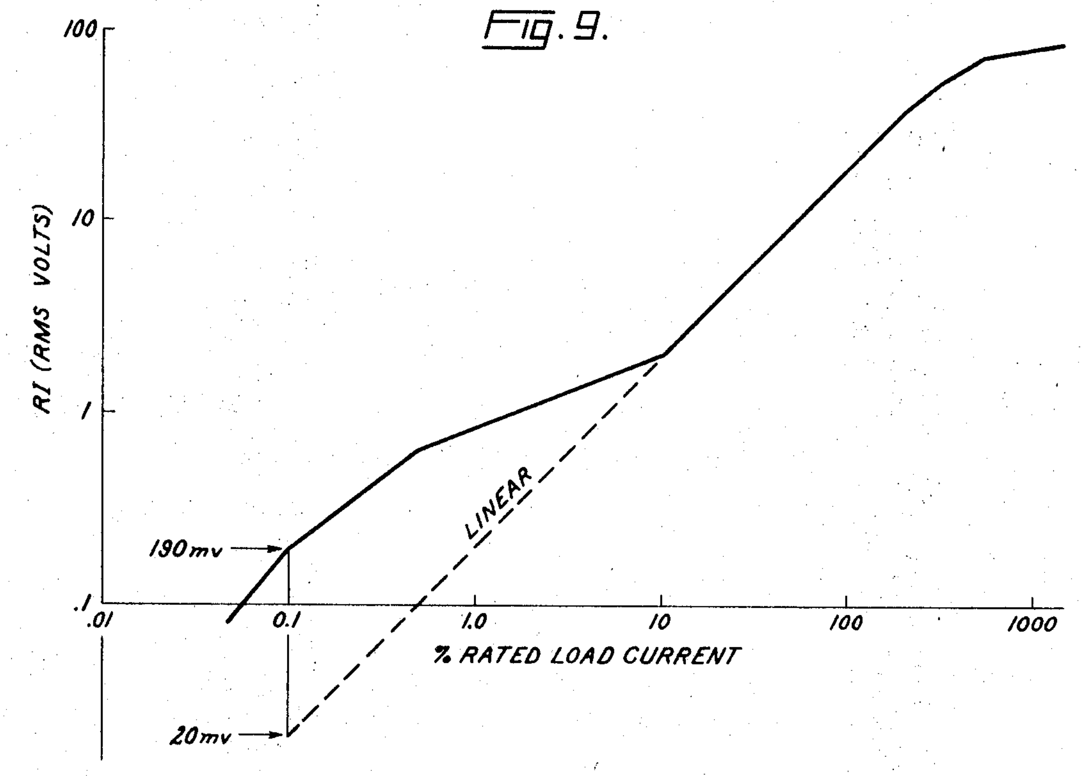
FIG. 9 is a graph of the amplitude with respect to rated load current of a signal obtained from the voltage deriving circuit of this invention.
Figure 10:
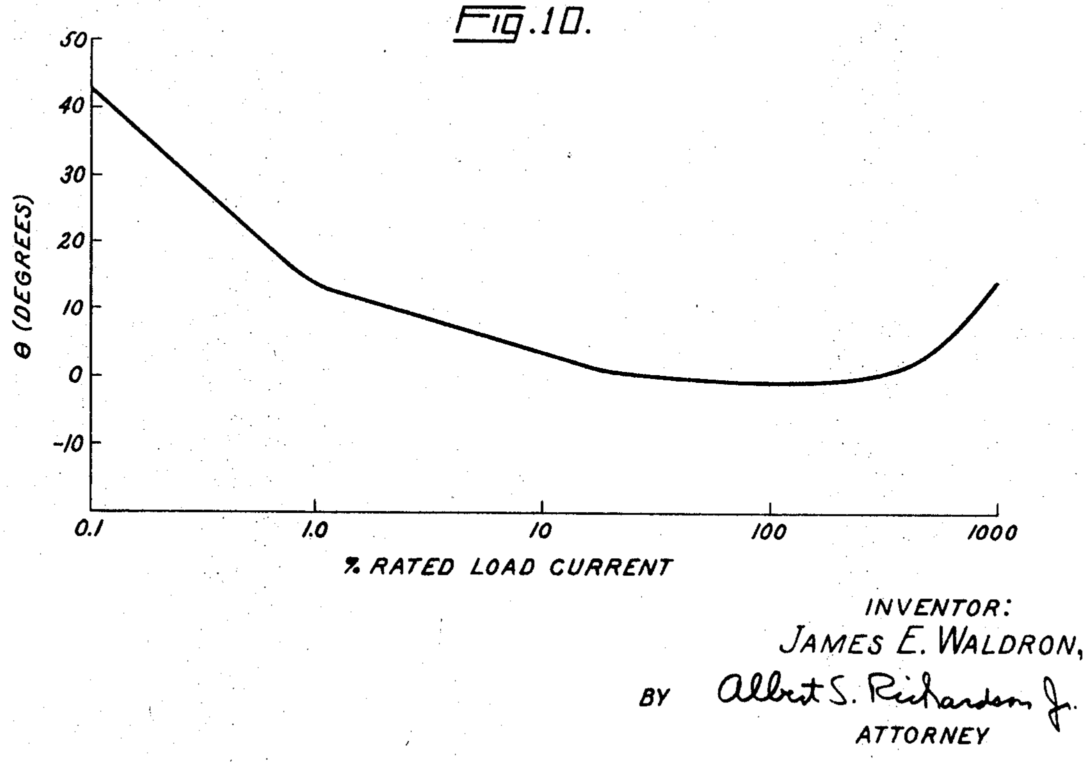
FIG. 10 is a graph of the phase angle of the voltage deriving circuit output signal.

As previously mentioned, each element 22 of the voltage deriving network 15 proportionately increases the magnitude of the signal RI at low current transformer secondary currents relative to high currents and shifts the phase of RI relative to the phase current. FIGS. 9 and 10 show graphs of the magnitude and phase angle of RI plotted against percentage of rated load current on logarithmic scales. At 0.1% of rated current, it can be seen that RI has a magnitude of approximately 190 mv., as opposed to 20 mv. obtained with a linear circuit, and a phase angle of approximately 42° relative to the phase current.

Figure 11:
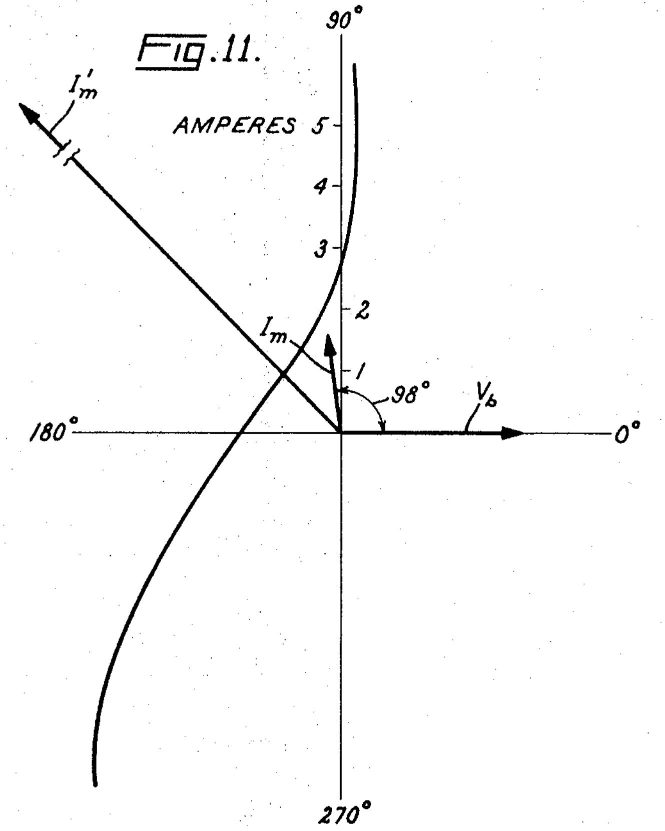
FIG. 11 is a generalized response curve for the power directional unit at low phase currents.

The advantage resulting from the nonlinearity of element 22 can be seen in FIG. 11 which shows the generalized response curve for very small, single phase currents in the range of 0–5 amps which, in the case of a system rated at 1600 amps, is approximately 0–0.3% of rated single phase load current. The minimum phase current needed to actuate the power directional unit 11 is adjustably set by potentiometer 49 in detector 31; the generalized response curve in FIG. 11 illustrates that the tripping coil 17 will not be energized unless the phase current exceeds that minimum.

When the station circuit breaker 4 is opened, a magnetizing current will flow in the secondary of network transformer 7 as the network 5 attempts to supply the primary feeder 3. Generally, this magnetizing current will be quite small and leading the network phase voltage in phase. For example, assume that potentiometer 49 has been adjusted to energize tripping coil 17 at 0.1% of rated load current, or 1.6 amps. Such a situation is shown by the generalized response curve in FIG. 11. Given a magnetizing current of 0.1% leading the network phase voltage by 90°, it is evident from FIG. 11 that no tripping occurs, as the vector $I_m$ representing the magnetizing current terminates to the right of the generalized response curve. Nevertheless, element 22, by shifting the phase of RI and increasing its magnitude, makes the vector $I_m$ appear to power directional unit 11 as vector $I_m^1$ whereupon tripping is obtained.

To complete this discussion of power directional unit 11, reference should be made to the embodiment of power supply 40 shown in FIG. 3. A high DC voltage $+E_2$ is obtained from a single diode 58 connected to the RI input of each modulator 28 and from a four diode bridge 59 connected to the + and −V inputs of each modulator 28. A low positive DC voltage $+E_1$ is derived from $+E_2$ through conventional resistor and Zener diode circuitry 59', and a low negative DC voltage $-E_1$ from the bridges 59. It should be noted that $+E_1$, $-E_1$, and $+E_2$ are supplied from the potential transformers 13 and current transformers 14 and that no separate power supply transformer is required.

The reclosing unit 12 assures that the network protector 8 cannot close under voltage conditions which would cause power to flow from the network 5 into the transformer 7. One set of such conditions is where the network protector 8 is open, and the transformer secondary voltage is greater in magnitude than the network voltage but lags it in phase angle. If the network protector 8 were allowed to reclose under this set of conditions, a circulating current would flow in addition to load current in the network. The circulating current would be 90° lagging the load current and of such a magnitude so that the resultant current could possibly terminate on the left-hand side of the power directional unit 11 tripping characteristic. Therefore, the network protector 8 would immediately open, then reclose, then open, resulting in a condition known as "pumping" of the network protector 8.

To eliminate pumping, the reclosing relay allows the network protector to reclose only if: (a) the transformer voltage is greater than the network voltage by a certain predetermined amount; and, (b) a voltage difference vector between the transformer voltage and the network voltage terminates in a certain quadrant of the network voltage characteristic as represented by a plot including the network voltage vector and transformer voltage vector, or, has a phase angle in a predetermined range with respect to network voltage; and, (c) the conductors 21 and 6 on each side of the network protector 8 are arranged in a proper phase sequence.

Now referring to FIG. 2, it can be seen that the reclosing unit 12 has inputs from a plurality of voltage transformers 60, 61 and 62 connected to the system and from leads directly connected to the system conductors. More particularly, one input is obtaned from a deriving means such as potential transformer 60 which has its primary connected to the phase A conductor on each side of network protector 8. In this manner, a voltage appearing at the grounded secondary of transformer 60 represents the voltage difference between the phase A condutcors and is hereinafter designated as $V_{tn_a}$. Two other inputs result from direct connections to the phase B conductors on either side of network protector 8 and are hereinafter designated as $V_{nb}$ and $V_{tb}$. Still another input to the reclosing unit 12 is provided by a deriving means such as potential transformer 61 whose primary is connected between the phase A network conductor and neutral, the secondary voltage thereof representing the phase A network conductor to neutral voltage, shifted through 180°, hereinafter designated as $-V_{na}$. Finally, an input is obtained from the phase C transformer conductor by means of an auto-transformer 62, the voltage thereon being designated as $V_{tc}$.

Generally, these inputs, with the exception of $V_{tc}$ which is connected to a power supply 63 of the reclosing unit 12, provide quantities which allow reclosing unit 12 to initiate closing of network protector 8 only when conditions (a)–(c) are fulfilled.

$V_{tn_a}$ is fed to a level detector 64 which provides no output signal only if $V_{tn_a}$ is positive and greater than a certain low magnitude. The output of level detector 64 is coupled to a first input of a logic circuit such as a NOR circuit 65. $V_{nb}$ and $V_{tb}$ are fed to a summation circuit 66 whose output is coupled to a second input of NOR circuit 65. Third and fourth inputs of NOR circuit 65 are furnished by $-V_{na}$ through two phase shift circuits 67, 68.

An output signal $V_2$ is obtained from NOR circuit 65 only when no signal is present at any of the four inputs thereto. As detailed hereinafter, an output signal $V_3$ is obtained from a timing circuit 69 only when $V_2$ persists for a certain time period, or a certain portion of the network voltage cycle. As $V_3$ is coupled to the input of an output stage 70, which in turn energizes closing coil 19 through contact 20 upon presence of $V_3$, it can be shown that in order to close network protector 8, no signal can be present at any input to NOR circuit 69 for at least the percentage of the network voltage cycle as established by timing circuit 69. For purposes of discussion, this portion is chosen as 85°. Accordingly, conditions (a)–(c) are met.

Figure 12:
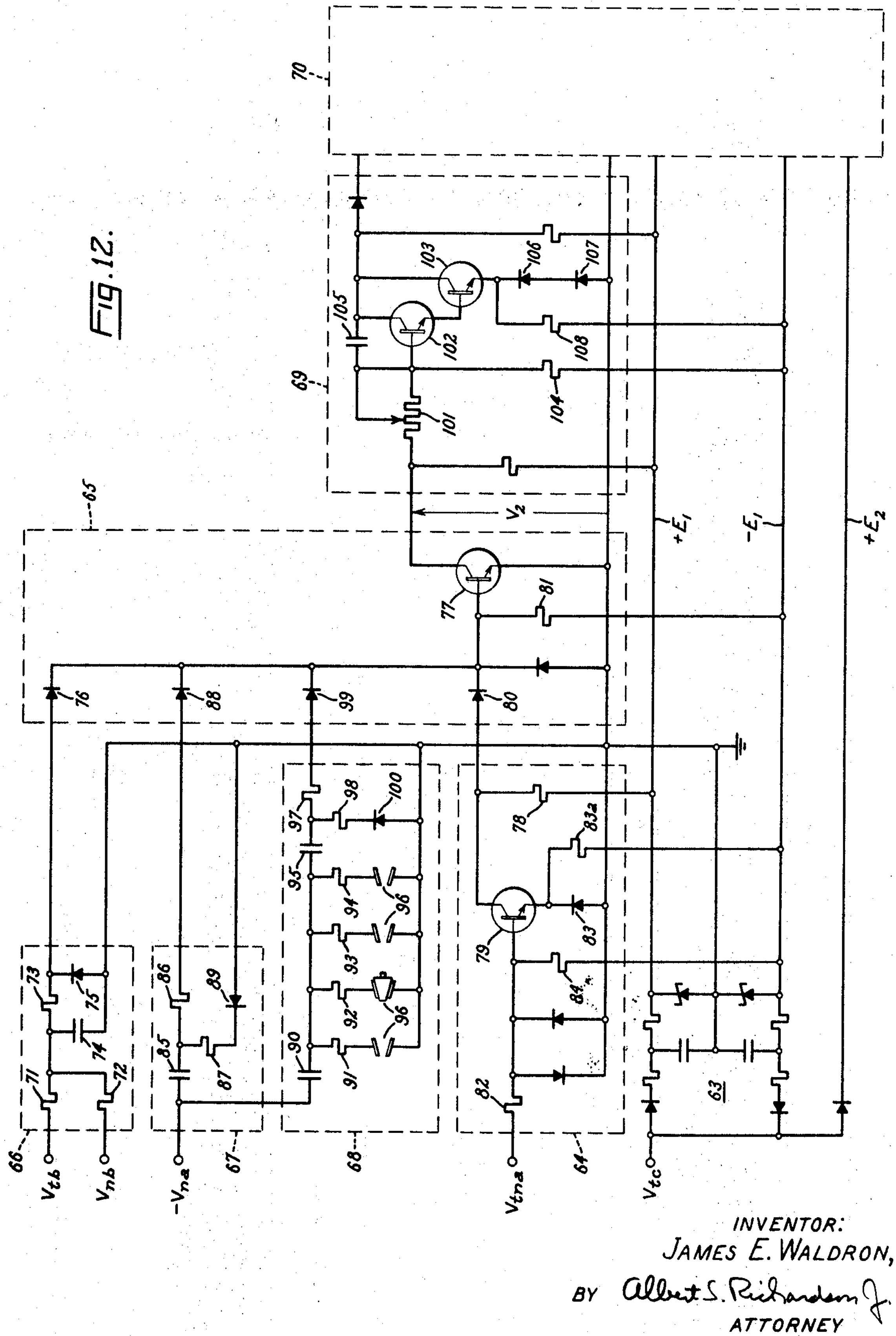
FIG. 12 is a schematic diagram of a preferred embodiment of the reclosing unit of this invention.

More specifically, condition (a) is satisfied when $V_{tn_a}$, or the difference voltage between $V_{ta}$ and $V_{na}$ is greater than a certain magnitude, as set by level detector 64. Condition (b) is satisfied when no output is obtained from level detector 64 during 85° or more of a segment of the network voltage cycle is bounded by $-V_{na}$ through phase shift circuits 67 and 68. In other words, an output signal is provided by one of the two phase shift circuits 67, 68 for all but a segment, such as 95°, of the network voltage cycle. It should be noted that this segment is greater in duration than the 85° time period established by timing circuit 69. Similarly, condition (c) is met when no output is obtained from summation circuit 66 during that segment. A specific embodiment of the reclosing unit 12 is shown in FIG. 12. Starting at the top of the figure, summation circuit 66 comprises a resistor 71 having a first end connected to $V_{tb}$ and a resistor 72 having a first end connected to $V_{nb}$. The second ends of resistors 71, 72 are connected to a common point with a first end of resistor 73 and a capacitor 74. Both capacitor 74 and a diode 75 connected to the second end of resistor 73 are connected to ground. The second end of resistor 73 is also connected by means of a diode 76 to an input of the NOR circuit 65.

The component values of summation circuit 66 are chosen so that the resulting input to NOR circuit 65 represents $K(V_{tb}+V_{nb})\ ^{-}45°$, where K is a constant and $^{-}45°$ denotes an angle of 45 degrees lag.

At this point, it can be noted that NOR circuit 65 comprises a semiconductor switching means such as a transistor 77 having its emitter connected to ground, its base connected to the NOR circuit inputs, and its collector as an output thereof. Normally, transistor 77 is maintained on by positive signals from one or more of the NOR circuit inputs. Under these conditions, the collector of transistor 77 is at zero volts. When no positive signal is applied to the base of transistor 77, the transistor is placed in a non-conducting state and its collector voltage rises to $V_2$ which approximately equals $+E_1$.

The $V_{tn_a}$ signal is fed through a resistor 82 to the base of a normally inactive transistor 79 in the level sensing means 64. The emitter of transistor 79 is negatively biased by a diode 83 in series with a resistor 83a between ground and the negative DC supply $-E_1$. Transistor 79 is normally biased off by a resistor 84 connected between its base and negative supply $-E_1$. The valve of resistor 84 and resistor 82 are chosen so that $V_{tn_a}$ must be positive and exceed a certain low magnitude in order for transistor 79 to turn on. Until this occurs, the detector 64 supplies a positive input to the NOR circuit 65 by means of a voltage divider including a resistor 78 connected between $+E_1$ and the collector of transistor 79, a diode 80 connected to the base of transistor 77, and a resistor 81 connected to $-E_1$. But when detector 64 is activated by $V_{tn_a}$, the collector voltage of transistor 79 goes to ground and the positive signal is removed from diode 80.

Phase shift circuit 67 comprises a capacitor 85 connected from the $-V_{na}$ input terminal to a common point of two resistors 86 and 87. Resistor 86 is connected to the base of transistor 77 through a diode 88 and an output terminal. Resistor 87 is connected through a diode 89 to ground, and its resistance value is selected so that current in the circuit 67 is essentially the same for both polarities of the input voltage, thereby promoting symmetry. The parameters are chosen so that the voltage presented to diode 88 is $-V_{na}$ shifted by five degrees phase lead, hereinafter designated as $-V_{na}5°$. As will be seen later from a discussion of the interaction of the various inputs to the NOR circuit 65, $-V_{na}$ 5° determines the maximum phase angle that $V_{tn_a}$ can have with respect to $V_{na}$.

Phase shift circuit 68 includes a capacitor 90 connected between $-V_{na}$ and a common point of a plurality of resistors 91, 92, 93, 94 and a capacitor 95. The resistors 91–94 are connected through a connecting block arrangement 96 to ground. Capacitor 95 is connected to a common point of two resistors 97, 98. Resistor 97 is connected through a diode 99 and the transistor 77 to ground, and for the sake of symmetry resistor 98 is connected through a second diode 100 to ground. In operation, any one of the resistors 91–94 may be chosen by inserting a connector in the appropriate connecting block 96. Thereby, the voltage presented to diode 99 can be $-V_{na}$ shifted through 100°, 90°, 80°, or 70° phase lead, hereinafter desgnated as $-V_{na}$ 90°, which determines the minimum phase angle that $V_{tn_a}$ can have with respect to $V_{na}$.

The collector of transistor 77 is connected to the timing circuit 69 which includes a variable resistor or rheostat 101 connected to the input of a Darlington pair of transistors 102, 103. Connecting the base of transistor 102 to the negative DC supply $-E_1$ is a resistor 104. A capacitor 105 is connected between the collector and the base of transistor 102. Furthermore, transistor 103 has its emitter connected to ground through a pair of serially-connected diodes 106, 107 which bias the emitter of transistor 103 at slightly below ground potential. A resistor, 108, connected between the emitter and the negative DC supply $-E_1$ serves as a current drain for the emitter on alternate half-cycles.

In operation, the time period of timing circuit 69 is established by the values of capacitor 105, rheostat 101, and resistor 104. Rheostat 101 provides means for adjusting the network voltage cycle during which the transistor 77 has to be nonconducting to enable circuit 69 to initiate closing of the network protector 8. It should be remembered that the transistor 77 is non-conducting only while none of the respective inputs to the NOR circuit 65 is positive, at which time a positive output $V_2$ is produced and supplied to the timing circuit. In the embodiment shown, $V_2$ must subsist for 85° of a 60 Hz. voltage cycle before transistors 102 and 103 saturate and their collector voltages are reduced approximately ground potential.

Output stage 70 is shown in FIG. 12 as being identical to output stage 32 of the power directional unit 11; what is required is that stage 70 energizes closing coil 19 when the collector voltage of transistor 103 goes to zero.

Likewise, power supply 63 is similar in construction to power supply 40 of power directional unit 11, but receives an input only from transformer 62 supplying $V_{tc}$.

Figure 15:
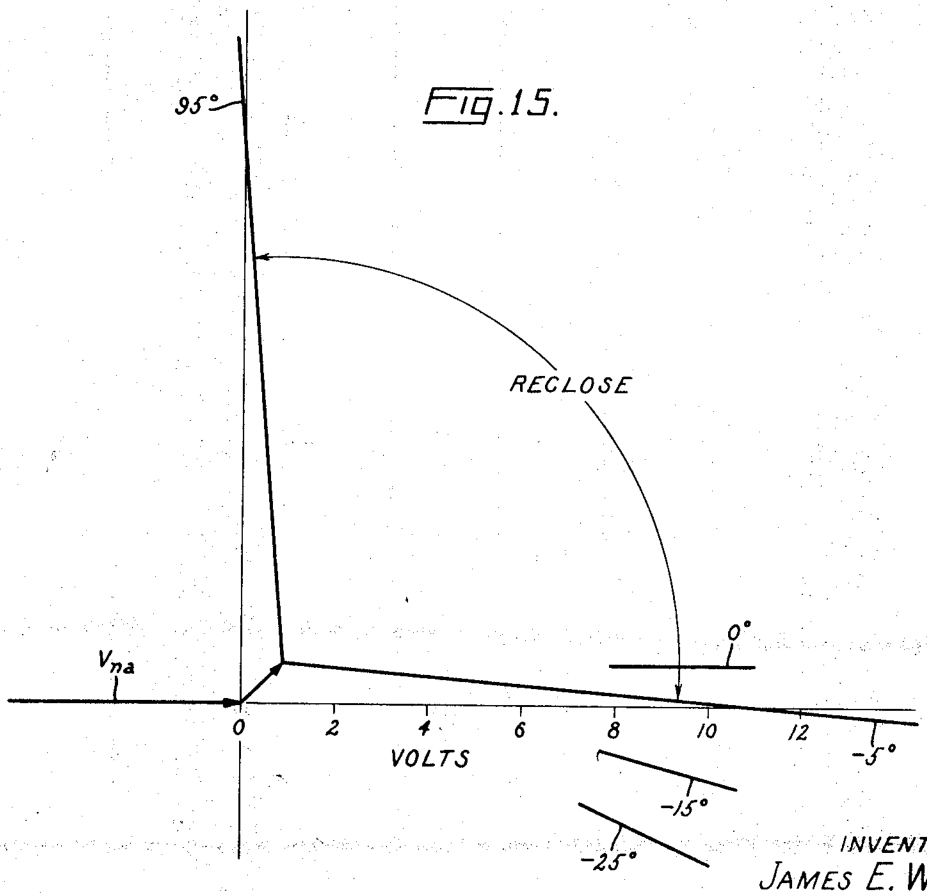
FIG. 15 is a generalized response curve for the reclosing unit.
Figure 13:
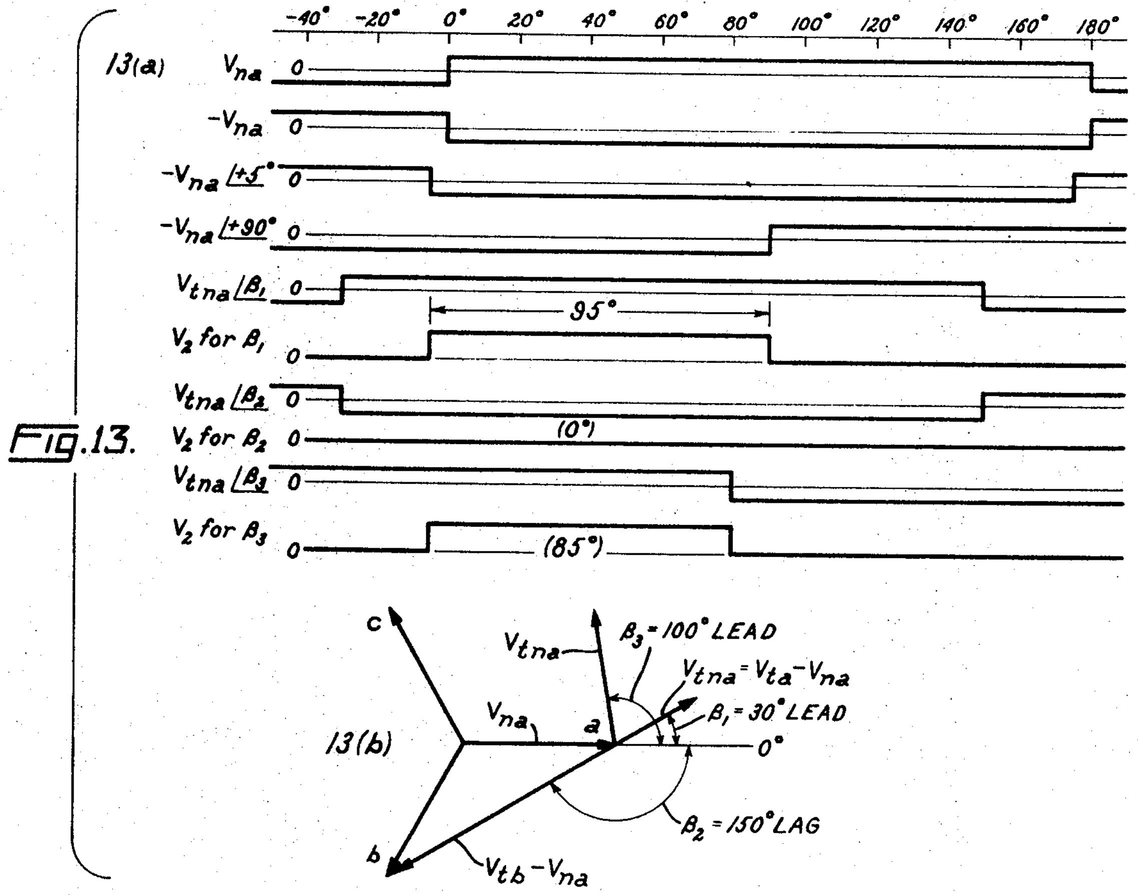
FIGS. 13 and 14 show timing charts and vector diagrams for the voltages of the reclosing unit.
Figure 14:
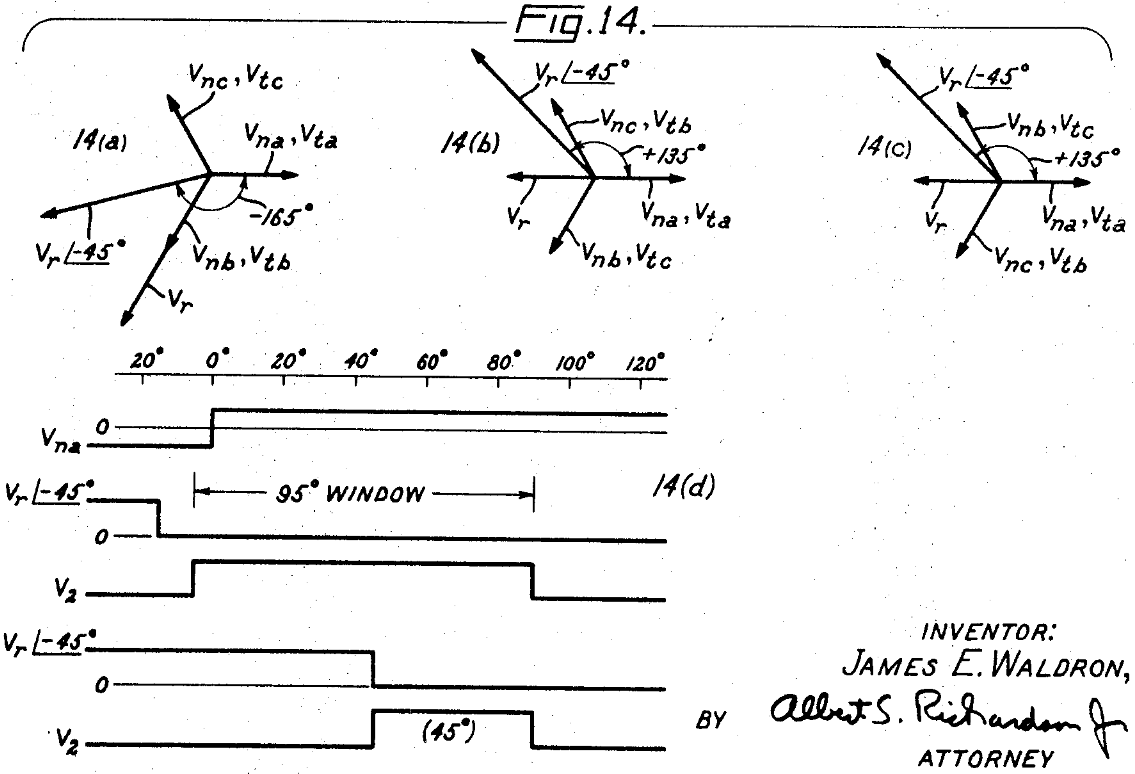

The interaction of the inputs to NOR circuit 65 is best illustrated by the timing charts of FIGS. 13 and 14 and the generalized response curve of FIG. 15. The voltages in FIGS. 13 and 14, although sinusoidal, have been represented as square waves due to the fact that each voltage is large with respect to a voltage required to actuate each transistor in the reclosing unit 12. At the top of FIG. 13, $V_{na}$ is shown as a reference, going positive at 0 degrees and negative at 180°. Its negative half cycle has been foreshortened. Immediately below is $-V_{na}$ or $V_{na}$ inverted. Immediately below $-V_{na}$ is $-V_{na}$ 5° and $-V_{na}$ 90°. As previously mentioned, $-V_{na}$ 5° and $-V_{na}$ 90° determine the critical segment of the cycle during which the reclosing unit 12 can operate if there is no output voltage from level detector 64 or summation circuit 66. In FIG. 13*a*, the critical segment is seen to be 95°, extending from $-5°$ to $+90°$. By choosing another of the resistors 91–94, the trailing end of the segment can be advanced or retarded so that the segment width is variable from 85°–115°, as desired. In each case, the segment corresponds to an angle that is the supplement of the phase displacement between the outputs of the phase shift circuits 67 and 68.

So long as $V_{ta}$ is greater in magnitude and appropriately leading in phase with respect to $V_{na}$, $V_{tn_a}$ will lead $V_{na}$ by an angle $_1$, designated 30° in FIG. 13(*b*), and it can be seen from the timing chart that $V_{tn_a}$ is positive before, during and after the 95° critical segment. It is obvious that since $V_{tn_a}$ now has a positive polarity and a magnitude exceeding a certain low threshold level, the level detector 64 is in its active state during this particular interval of time. Therefore, assuming no output from summation circuit 66, the NOR circuit 65 receives no input signal for the entire 95° segment and its output $V_2$ is coincident therewith as shown. Since the timing circuit 69 requires that $V_2$ continuously exist for 85° before reclosing is permitted transistors 102 and 103 saturate near the end of the critical segment to actuate output stage 70 to energize closing coil 19.

In a second case, assume that the first pole of the network protector has been connected by mistake to phase B of the network transformer secondary instead of phase A. Then, the difference voltage supplied to the relay would be $V_{tb}-V_{na}$, which would lag $V_{na}$ by $_2$ which is greater than 90°. This situation is illustrated in the diagram of FIG. 13(*b*) and in the timing chart of FIG. 13(*a*) wherein $B_2$ is shown as an 150° angle. $V_{tn_a}$ is negative for the 95° critical segment, and therefore no signal $V_2$ can be supplied to the timing circuit 69 in this case.

A third case is illustrated when the phase angle between $V_{tn_a}$ and $V_{na}$ equals 100° lead, designated as $_3$. This is the maximum angle that $V_{tn_a}$ can lead $V_{na}$ and still ensure closing. From the timing diagram, it can be seen that $V_{tn_a}$ is positive for 85° of the 95° segment. Thus, $V_2$ persists for exactly 85°, or the minimum required to produce an output from timing circuit 69.

Operation of the reclosing unit is also affected by the summation circuit 66 which adds $V_{tb}$ and $V_{nb}$ and shifts their sum by a phase angle of 45° lag. By reference to FIG. 14, the effect of summation circuit 66 can be ascertained. FIGS. 14(*a*), 14(*b*) and 14(*c*) show vector diagrams for three possible combinations of conductor connections to the network protector 8. In FIG. 14(*a*), the phase sequence is A, B, C on both sides of the protector. Vector $V_r$ represents the sum of $V_{nb}$ and $V_{tb}$; it is evident that $V_r$ lags $V_{na}$ by 120° when the phase sequence is correct on both sides of the protector. $V_n-45°$ represents the output of summation circuit 66. Thus, $V_r-45°$ lags $V_{na}$ by 165°. The timing chart of FIG. 14(*d*) shows $V_{na}$ and the previously described critical segment or window of 95°. The quantity $V_r-45°$ is not positive at any time during this segment. Assuming no output from level detector 64, the voltage $V_2$ on the collector of transistor 77 is positive for 95° resulting in energization of closing coil 19.

However, as shown in FIGS. 14*b* and 14*c*, if the phases are reversed in any combination on either side of the network protector 8, the vector $V_r<45°$ leads $V_{na}$ by 135°. This condition is also illustrated in FIG. 14(*d*), wherein it can be clearly seen that $V_r<-45°$, is negative for only 45° of the 95° segment. Thus, no output will be produced by timing circuit 69.

A generalized response curve for reclosing unit 12 is shown in FIG. 15. $V_{na}$ is used as a reference vector, positioned along the 0° axis. The level detector 64 provides an offsetting of the response curve from the tip of $V_{na}$. As shown, $V_{tn_a}$ must be 1% of $V_{na}$ at an angle of 45° lead for the output of level detector 64 to change. The vertical boundary at 95° is determined by $-V_{an}<5°$ or the output of phase shift circuit 67. The horizontal boundaries at 0°, −5°, −15°, and −25° are determined by $-V_{na}<100°$, 90°, 80°, and 70°, or the output of phase shift circuit 68. Disregarding $V_{tb}$ and $V_{nb}$, $V_{tn_a}$ must fall within the area denoted "Reclose" for the reclosing coil 19 of the network protector 8 to be energized.

While this invention has been described with reference to a preferred embodiment and several illustrative examples thereof, it is to be clearly understood by those skilled in the art that various modifications may be made therein without departing from the true scope and spirit of the invention.

What I claim as new and desire to secure by United States Letters Patent is:

1. A static relay responsive to the direction of electric power in an A-C system whose voltage is relatively constant, comprising:

(a) means for deriving from the system a first A-C signal which is proportional to current flow therein;

(b) means for modulating the first A-C signal according to the polarity of a second A-C signal proportional to the associated system voltage, said modulating means thereby producing a bipolarity output signal whose average value is proportional in magnitude and in sense to real power flow in the system; and (c) means responsive to the output signal of said modulating means for initiating a preselected control function when the average value of the output signal exceeds a predetermined amount and has a polarity indicating that power is flowing in a predetermined direction.

2. The relay of claim 1 for a 3-phase electric power system, wherein:

(a') a first A-C signal deriving means is provided for each phase of the system;

(b') separate modulating means is provided for each phase of the system: and wherein said control function initiating means comprises:

(d) summation and filtering means connected to all three modulating means for producing a resultant output signal which is the algebraic sum of the average values of the respective output signals of said modulating means, and (e) a polarity detector connected to said summation and filtering means for actuation by a resultant output signal of appropriate magnitude and polarity, whereby said control function initiating means is responsive to net power in the 3-phase A-C system.

3. The relay of claim 2 wherein each A-C signal deriving means includes an element connected across a secondary winding of a current transformer whose primary winding is coupled to the associated phase of the system, said first A-C signal comprising the voltage across said element, said element comprising a first resistor in series with a parallel circuit comprising a second resistor and a pair of reverse-parallel connected diodes, said second resistor having a larger resistance than said first resistor, said diodes conducting at relatively high current transformer secondary currents but not at low currents, whereby the relative magnitude and phase of the voltage obtained from the element at low currents is different than at high currents.

4. The relay of claim 2 wherein each modulating means comprises a bridge circuit having the corresponding first A-C signal applied to one leg thereof, the corresponding second A-C signal applied to two other legs thereof, and an output taken from the remaining leg, said bridge circuit including four diodes which conduct the first A-C signal to the output only when the second A-C signal has a predetermined polarity.

5. The relay of claim 4 wherein each second A-C signal is derived from the system by means of a grounded, center- tapped secondary of a potential transformer whose primary is disposed between a neutral conductor of the system and the associated phase conductor.

6. The relay of claim 1 wherein said modulating means comprises a bridge circuit having the first A-C signal applied to one leg thereof, the second A-C signal applied to two other legs, and an output taken from the remaining leg, said bridge circuit including four diodes which conduct the first A-C signal to the output only when the second A-C signal has a predetermined polarity.

7. The relay of claim 6 wherein said first A-C signal deriving means includes an element connected across a secondary winding of a current transformer whose primary winding is coupled to the A-C system, said first A-C signal comprising the voltage across said element, said element comprising a first resistor in series with a parallel circuit comprising a second resistor and a pair of reverse-parallel connected diodes, said second resistor having a larger resistance than said first resistor, said diodes conducting at relatively high current transformer secondary currents but not at low currents, whereby the relative magnitude and phase of the voltage obtained from the element at low currents is different than at high currents.

8. The relay of claim 1 in which the control function initiating means comprises a low pass filter in series with a polarity detector, said low pass filter being energized by the output signal of said modulating means and said polarity detector initiating the preselected control function in response to the output of the low pass filter attaining a predetermined threshhold magnitude and a predetermined polarity.

9. The relay of claim 8 in which said polarity detector includes means for delaying its response to the output of said low pass filter attaining said predetermined magnitude and polarity.

10. The relay of claim 1 wherein said preselected control function comprises the energization of a tripping coil of a circuit breaker connected in the A-C system, said circuit breaker also being equipped with a closing coil which is energizable by reclosing control means in response to system conditions indicating that after the breaker is closed power will flow in a direction opposite to said predetermined direction.

11. The relay of claim 1 in which the first A-C signal deriving means includes an element connected across a secondary winding of a current transformer whose primary winding is coupled to the A-C system, said first A-C signal comprising the voltage across said element, said element comprising a first resistor in series with the parallel combination of a second resistor and two reverse-parallel connected diodes, said second resistor having a larger resistance than said first resistor, said reverse-parallel connected diodes conducting at relatively high current transformer secondary currents but not at low currents, whereby the relative magnitude and phase of the voltage obtained from the element at low currents is different than at high current.

12. Means for deriving an A-C voltage representative of current flowing in an electric power system comprising:

(a) a current transformer having primary and secondary windings, said primary winding being coupled to the electric power system;

(b) first and second resistors, said second resistor having a larger resistance than said first resistor;

(c) means for connecting said first and second resistors in series with each other across said secondary winding, the voltage across said resistors being representative of system current; and (d) a pair of reverse-parallel connected diodes connected across said second resistor.

13. The voltage deriving means of claim 12 in which surge voltage limiting means is connected across the secondary winding of said current transformer.

14. For use in a power distribution system including an alternating current secondary network supplied at a plurality of points from one or more primary feeders, each of said points being connected to a primary feeder by means of a network protector and a transformer, a static relay for supervising a closing operation of the network protector comprising:

(a) means for deriving from the system a first A-C signal proportional to voltage on the network side of the network protector;

(b) phase shifting means responsive to the first A-C signal for producing second and third signals which are respectively shifted in phase relative to the first A-C signal by different amounts;

(c) level sensing means coupled to the system for comparing said network voltage with a corresponding voltage on the transformer side of the network protector, said level sensing means having a predetermined active state whenever the latter voltage exceeds the former by at least a certain magnitude and is positive with respect thereto;

(d) logic means connected to said phase shifting means and to said level sensing means for producing an output signal only while said level sensing means is in its active state and said second and third signals both have concurrently a predetermined polarity; and (e) timing means connected to said logic means for initiating closing of the network protector only if the output signal of said logic means persists for at least a predetermined time period, said time period being no longer than a segment of the network voltage cycle corresponding to an angle that is the supplement of the phase angle between said second and third signals, whereby the network protector can close only when power thereafter will flow from the transformer to the network.

15. The relay of claim 14 for a three-phase power distribution system, wherein said network voltage and said transformer voltage are both taken from a first phase of the system.

16. The relay of claim 15 including means for deriving a fourth signal proportional to the sum of the voltage of a second phase of the system on the network side of the protector and the voltage of the second phase of the system on the transformer side of the protector, and wherein said logic means is additionally connected to said means for deriving the fourth signal, said logic means being so arranged that it cannot produce its output signal unless said fourth signal also has said predetermined polarity.

17. The relay of claim 14 wherein the phase angle between said second and third signals is within the range of approximately 65° to 95° and said segment of the network voltage cycle is approximately 85°.

18. The relay of claim 14 wherein said phase shifting means includes a circuit comprising a capacitor, first and second resistors, and a diode, said capacitor having a first side to which said first A-C signal is applied and a second side connected to the first side of both of said resistors, the second side of said first resistor being coupled through said diode to ground, and the second side of said second resistor being coupled through said logic means to ground.

19. The relay of claim 14 wherein the timing means effects energization of a closing coil of the network protector, the network protector also being equipped with a tripping coil which is energizable by protective means in response to system conditions indicating that power is flowing from the network toward the transformer.

20. The relay of claim 19 wherein said protective means comprises:

(f) means for deriving from the system a fourth signal which is proportional to alternating current flow therein;

(g) means for modulating the fourth signal according to the polarity of a fifth signal proportional to the associated system voltage, said modulating means thereby producing a bipolarity output signal whose average value is proportional in magnitude and in sense to real power flow in the system; and (h) means responsive to the output signal of said modulating means for energizing said tripping coil when the average value of the last-mentioned signal has a polarity indicating that power is flowing from the network toward the transformer.

References Cited

UNITED STATES PATENTS

| | | | |
|---|---|---|---|
| 2,999,173 | 9/1961 | Ruck | 307—235 |
| 3,117,252 | 1/1964 | Baude | 317—33 X |
| 3,312,864 | 4/1967 | Schwanenflugel | 317—23 |

JAMES D. TRAMMELL, Primary Examiner

U.S. Cl. X.R.

307—87, 127; 317—26, 33, 36, 39, 49